United States Patent [19]

Kadokura et al.

[11] Patent Number: 5,205,373
[45] Date of Patent: Apr. 27, 1993

[54] STRUCTURE OF VEHICLE POWER TRAIN

[75] Inventors: Masaki Kadokura; Hideaki Akahoshi, both of Hiroshima, Japan

[73] Assignee: Mazda Motor Corporation, Hiroshima, Japan

[21] Appl. No.: 665,278

[22] Filed: Mar. 6, 1991

[30] Foreign Application Priority Data

Mar. 9, 1990 [JP] Japan .................................. 2-59524

[51] Int. Cl.$^5$ ..................... B60K 17/34; B60K 17/344
[52] U.S. Cl. ................................... 180/248; 180/233; 180/374
[58] Field of Search ................. 180/233, 248, 249, 374

[56] References Cited

U.S. PATENT DOCUMENTS

| | | | |
|---|---|---|---|
| 1,808,109 | 6/1931 | Heinze | 180/233 |
| 3,732,943 | 5/1973 | Panhard | 180/233 |

FOREIGN PATENT DOCUMENTS

| | | | |
|---|---|---|---|
| 327761 | 8/1989 | European Pat. Off. | 180/233 |
| 3145279 | 5/1983 | Fed. Rep. of Germany | 180/233 |
| 2509236 | 1/1983 | France | 180/233 |

*Primary Examiner*—Mitchell J. Hill
*Attorney, Agent, or Firm*—Sixbey, Friedman, Leedom & Ferguson

[57] ABSTRACT

A structure of vehicle power train having an engine situated lengthwise in a vehicle and a transmission disposed in the side of the engine in parallel comprises a front differential unit, which distributes a power outputted from the transmission to right and left front wheels, disposed in front of transmission in the longitudinal direction of the vehicle and between the engine output shaft and transmission output shaft in the widthwise direction of the vehicle. The centroid of the power train is positioned to the rear of the front wheels and accordingly, a load on the front wheels is reduced without lengthening a wheel base. By disposing the power train to the front of the transmission, the passenger compartment is widened. The overall height and length of the power train in the longitudinal direction of the vehicle is decreased, and the power train becomes compacted. Since the front differential unit is positioned almost center in the widthwise direction of the vehicle, a front axle shaft is formed symetrically and securing the torque transmission to front right wheel and front left wheel can be accomplished.

12 Claims, 11 Drawing Sheets

STRUCTURE OF VEHICLE POWER TRAIN

BACKGROUND OF THE INVENTION

The present invention relates to a structure of a vehicle power train which comprises an engine situated lengthwise in a vehicle and a transmission disposed adjacent to the engine in parallel.

In the FF vehicle (Front engine, Front wheel drive vehicle) or FF derivative four wheel drive vehicle, a known power train has an engine situated transversely so that the axis of the output shaft of the engine extends in the widthwise direction of the vehicle body and a transmission situated to the rear of the engine in the longitudinal direction. This power train is defined as a transversaly situated power train herein below. This transversaly situated power train possesses an advantage such as a smooth transmittance of the driving power since the output shaft of the engine and input and output shafts of the transmission are parallel to an axle shaft of the front wheel. However, if the transversaly situated power train is placed on the vehicle having a normal wheel base, almost all the weight of the power train is loaded on the front wheels. Accordingly, the weight loaded on the front wheels is too large compared with the FR vehicle (Front engine, Rear drive vehicle) having an engine and a transmission situated lengthwise in a line (this power train is defined as a lengthwise situated power train herein below).

Therefore, a method that arranges the front wheel to further front than the normal vehicle so as to set the centroid to the rear of the front wheel may be taken in order to reduce the load on the front wheel. However, the wheel base between the front wheels and the rear wheels gets longer by this arrangement and the turning radius to the steering angle gets large, i.e., the steering worsens.

Also, it seems available to take another method that arranges an engine and a transmission to be disposed lengthwise in a line as the above FR vehicle so as to form a power transmission mechanism for transmitting the output of the transmission to a front wheel axle shaft. However, the transmission is situated below the passenger compartment and the tunnel part projects into the passenger compartment. This results in that the FF vehicle looses an advantage such as a wide passenger compartment.

Therefore, a power train having an engine situated lengthwise and a transmission under the engine (this power train is defined as a lengthwise situated and parallel type power train herein below) is proposed (for example, refer to the Japanese Utility Model Registration Laying Open Gazette No. 56-73940). The vehicle placed this lengthwise situated and parallel type power train passes less load on the front wheels and larger passenger compartment, as compared a vehicle having the transvarsaly situated power train.

However, since the overall height of the power train is higher and the length of a vehicle is longer in the longitudinal direction of the vehicle in this lengthwise situated and parallel type power train, there exist a problem that the power train cannot become compacted.

The object of the present invention is to provide a structure of a compact vehicle power train which lowers the load on the front wheels without causing disadvantages such as a longer wheel base and a smaller passenger compartment in a FF vehicle or a FF derivative four wheel drive vehicle.

SUMMARY OF THE INVENTION

In order to achieve the above object, the present invention includes a power train having an engine situated lengthwise in a vehicle and a transmission adjacent to the engine in parallel. A front differential unit distributing a power from the transmission to front right wheel and front left wheel is provided in front of the transmission in the longitudinal direction of the vehicle and between the engine output shaft and the transmission output shaft in the widthwise direction of the vehicle.

In the above power train, an output member outputting the power of the transmission is disposed near the rear end of the transmission, and the power outputted from this output member is transmitted to the front differential unit through a front wheel driving shaft interposed between the engine and the transmission.

Accordingly, the engine is inclined to the transmission in the widthwise direction of the vehicle body. The engine is a V-type engine having right and left banks, and the intake air system is provided on the upper side of the bank on the transmission side.

Various types of power trains are described below.

A center differential unit distributing the power from the transmission to the front wheels and the rear wheels is provided in front of the transmission in the longitudinal direction of the vehicle. Therefore, the front differential unit is disposed either in front of the center differential unit or between the center differential unit and the transmission.

The center differential unit distributing the power from the transmission to the front wheels and the rear wheels is disposed between the engine and the transmission in the widthwise direction of the vehicle. Therefore, the center differential unit is disposed between the front differential and the transmission in the longitudinal direction of the vehicle body.

Also, the center differential unit distributing the power from the transmission is disposed coaxially with the front axle shaft.

In the above vehicle power train, the center differential unit distributing the power from the transmission to the front wheels and the rear wheels and a front differential unit distributing the power from the center differential unit are disposed in front of the transmission in the longitudinal direction.

BRIEF DESCRIPTION OF THE DRAWINGS

FIG. 9 is a skeleton diagram of a torque transmission of a sixth embodiment of the present invention.

FIG. 10 is a skeleton diagram of a torque transmission of a seventh embodiment of the present invention.

FIG. 15 is a skeleton diagram of a torque transmission of a twelfth embodiment of the present invention.

FIG. 16 is a skeleton diagram of a torque transmission of a thirteenth embodiment of the present invention.

DESCRIPTION OF THE PREFERRED EMBODIMENT

Preferred embodiments are described below.

Figure 1:
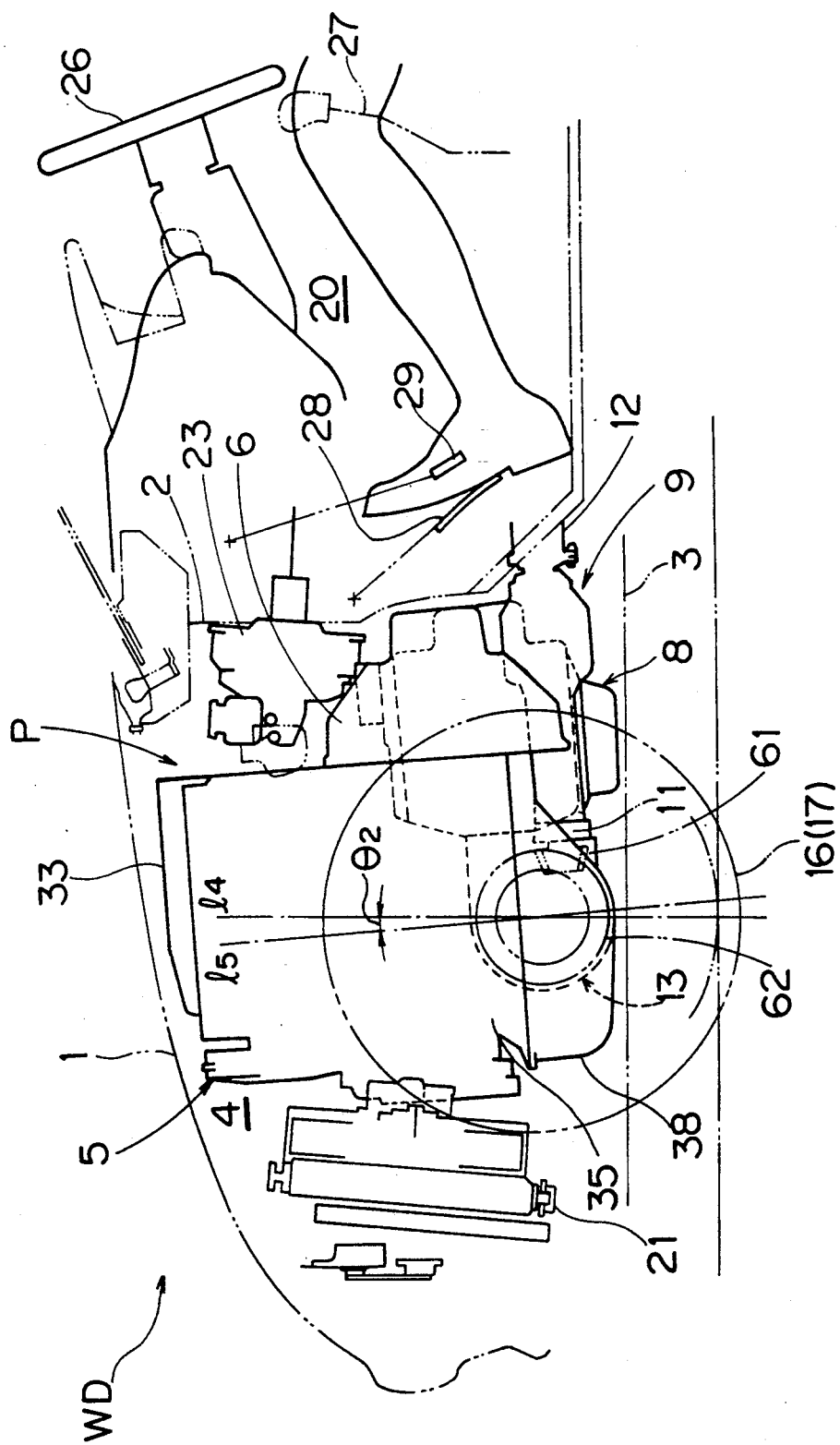
FIG. 1 is a side view of a four wheel drive vehicle comprising a power train of a first embodiment wherein a vehicle body is removed.
Figure 2:
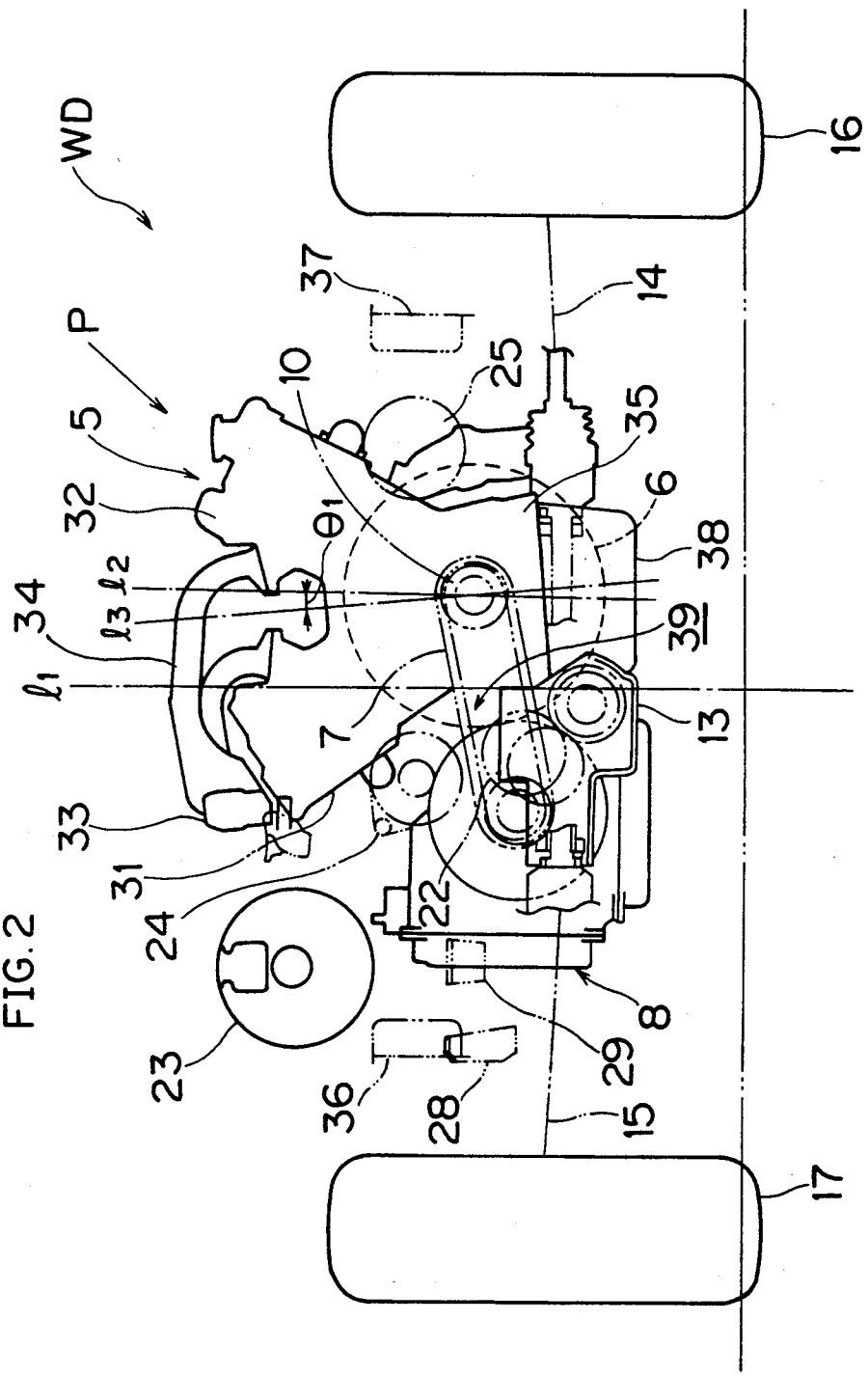
FIG. 2 is a front view of a four-wheel vehicle from the view of an engine room.

In the first embodiment, as shown in FIGS. 1 and 2, a power train P of a FF derivative four wheel drive vehicle WD (defined as a vehicle below) is situated in an engine compartment 4 formed by a bonnet 1, a dash panel 2, and a bottom member 3.

This power train P transmits torque outputted from a V-type lengthwise situated engine 5 to an automatic transmission 8 through both a torque convertor 6 adjacent to the rear end of the engine 5 and a drive chain mechanism 7, and further transmits the torque converted at the transmission 8 to a front wheel drive shaft 11 and a rear wheel drive shaft 12 through a center differential unit 9. The torque of the front wheel drive shaft 11 is transmitted to right and left front wheels 17, 16 through right and left front axle shafts 15, 14. The torque of the rear wheel drive shaft is transmitted to right and left rear wheels through rear differential unit and right and left rear axle shafts (not shown in the drawing).

A radiator 21 cooling the cooling water of the engine 5, a power steering 22, a brake master cylinder 23, an alternator 24, a compressor 25 of an air conditioner are provided in the engine compartment 4. A steering wheel 26, a shift lever 27 for changing a range of automatic transmission 8, an accelerator pedal 28, and a brake pedal 29 are provided in a passenger compartment 20 formed to the rear of the dash panel 2.

A power train P composed of the engine 5, the torque convertor 6, the drive chain mechanism 7, and the transmission 8 is described below.

The engine 5 is situated lengthwise so that the longitudinal direction of the engine is set in the longitudinal direction of the vehicle WD (in the lateral direction in FIG. 1), i.e., an axis of an engine output shaft 10 is set in the longitudinal direction of the vehicle. The center of the engine 5 (almost the centroid position) is positioned near the front wheels 16, 17 or a little rearward of the front wheels 16, 17. The engine 5, as shown in FIG. 1, is inclined frontwardly, i.e., a vertical axis $l_5$ of the engine 5 is inclined at $\theta°$ to the vertical axis $l_4$ of the vehicle WD from a view of a vehicle side.

Also, as shown in FIG. 2, the center of the engine 5 is situated to a little left of the center line $l_1$ of the vehicle WD in the widthwise direction (right side in FIG. 2) and accordingly, the centroid of the engine 5 is in the left of the center line $l_1$. Furthermore, an upper side of the engine 5 is inclined to the right, i.e., to the transmission 8. Since the vertical axis $l_3$ of the engine 5 is inclined at $\theta°$ to the right (to the transmission 8) of the vertical axis $l_2$ of the vehicle WD, the upper surface of the right bank 31 of the engine 5 is lower than the upper surface of a left bank 32. A surge tank 33 is provided above the upper surface of the right bank 31. The surge tank 33 and cylinders of banks 31, 32 communicate to each other through an intake air passage 34.

The torque convertor 6 adjacent to the rear end of the engine 5 is as high as the lower half of the engine 5.

The transmission 8 is situated to the right of the center line $l_1$ of the vehicle WD, i.e., on the right side of the engine 5. The longitudinal direction of the axes of an input shaft and an output shaft 44, 47 are set in the longitudinal direction of the vehicle. Also, the transmission 8 is overlapping a part of the rear end of the engine 5 and the torque converter 6 in the longitudinal direction of the vehicle, so the transmission 8 is positioned to the rear of the front wheels 16, 17. In the vertical direction, the transmission 8 is positioned a little lower than the torque converter 6.

An appropriate space is formed between the transmission 8 and either the lower part of a cylinder block 35 of the engine 5 (a part not bifurcated into the banks 31, 32) or an oil pan 38. As described above, since the engine 5 is inclined forwardly, the right bank 31 is overlapping the left half part of the transmission 8. The power train P is interposed between the right and left side flanges 37, 36.

In the above construction, first, the engine 5 is situated lengthwise, the centroid of the engine is positioned near the front wheels 16, 17 or to the rear of the front wheels 16, 17. The centroids of the torque converter 6 and the transmission 8 are further to the rear of the front wheels 16, 17. Thus, the centroid of the overall power train P is positioned to the rear of the front wheels 16, 17, i.e., midship method. Consequently, the load to the front wheels 16, 17 is reduced.

Furthermore, the transmission 8 is situated to the front of the passenger compartment 20 since the transmission 8 is disposed to the side of the engine 5. Therefore, the tunnel part does not project into the passenger compartment 20 and the wider passenger compartment 20 is available. The wheel base does not need to be longer than the normal vehicles.

Also, since the engine 5 is inclined to the transmission 8, the unbalanced load of the power train P in the widthwise direction of the vehicle is reduced. In detail, the engine 5 is situated to the left of the center line $l_1$, and the transmission 8 is situated to the right of the center line $l_1$. Since the engine 5 is much heavier than the transmission 8, the weight of the power train P is mainly loaded on the engine 5 side. Accordingly, the load to the vehicle WD in the widthwise direction is unbalanced, if the engine 5 and the transmission 8 are just situated in parallel. However, in this embodiment, since the engine 5 is inclined to the transmission 8, the centroid of the engine 5 is on the transmission 8 side. Therefore, the unbalance of the centroid of the power train P is reduced and the vehicle body WD is loaded evenly.

The intake air system is lowered since the intake air system such as the surge tank 33 is provided on the above the upper end of the right bank 31, which is lowered according with the inclination of the engine 5. Thus, the overall height of the power train system including the intake air system is lowered and the lower bonnet of the vehicle WD can be planned.

Furthermore, since the engine is inclined frontwardly, the front upper surface of the power train P is lowered, and the bonnet of the vehicle body WD can be further lowered. In other words, since the normal bonnet is inclined downwardly at the front of the vehicle body, the power train interrupts with the bonnet in the front part of the vehicle. However, the front upper surface of the power train P is lowered in this embodiment, and accordingly, the above interruption is not easily caused and lower bonnet of the vehicle body WD can be planned. In the lengthwise situated in line power train, if the engine is inclined frontwardly, the transmission or the propeller shaft is positioned higher. Therefore, the transmission or the propeller shaft interrupts with the passenger compartment. Thus, in the lengthwise situated in line power train, it is hard to lower the bonnet if the engine is inclined frontwardly. According to the present embodiment, the position of the rear wheel drive shaft 12 is not affected by the inclination of the engine 5 in the longitudinal direction. This results in that the engine 5 can be inclined without being restricted and consequently, the lower bonnet of the vehicle body WD can be planned.

A device for transmitting the torque from the power train P to the front and rear wheels is described below.

Figure 3:
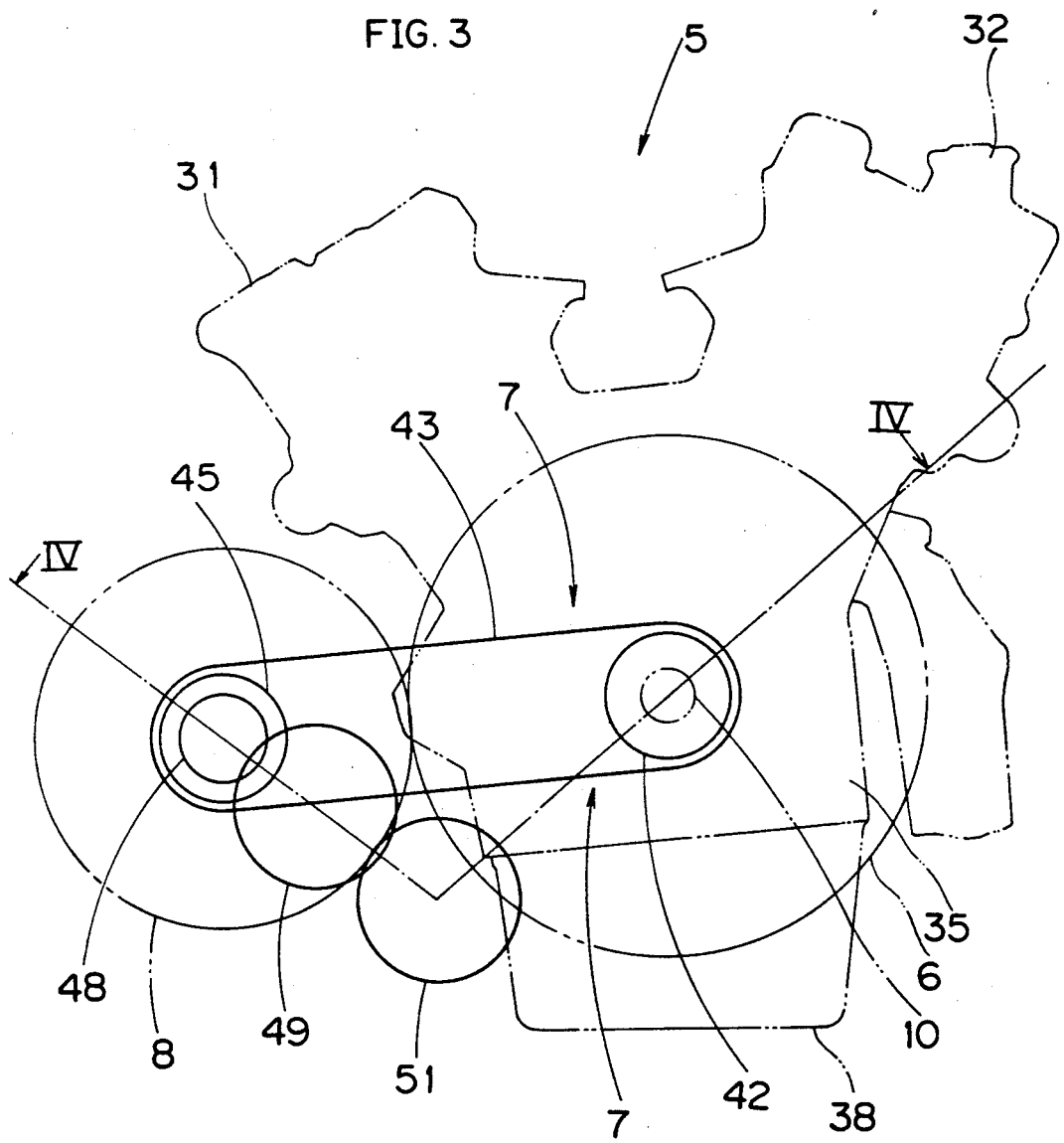
FIG. 3 is a front view of a power train.
Figure 4:
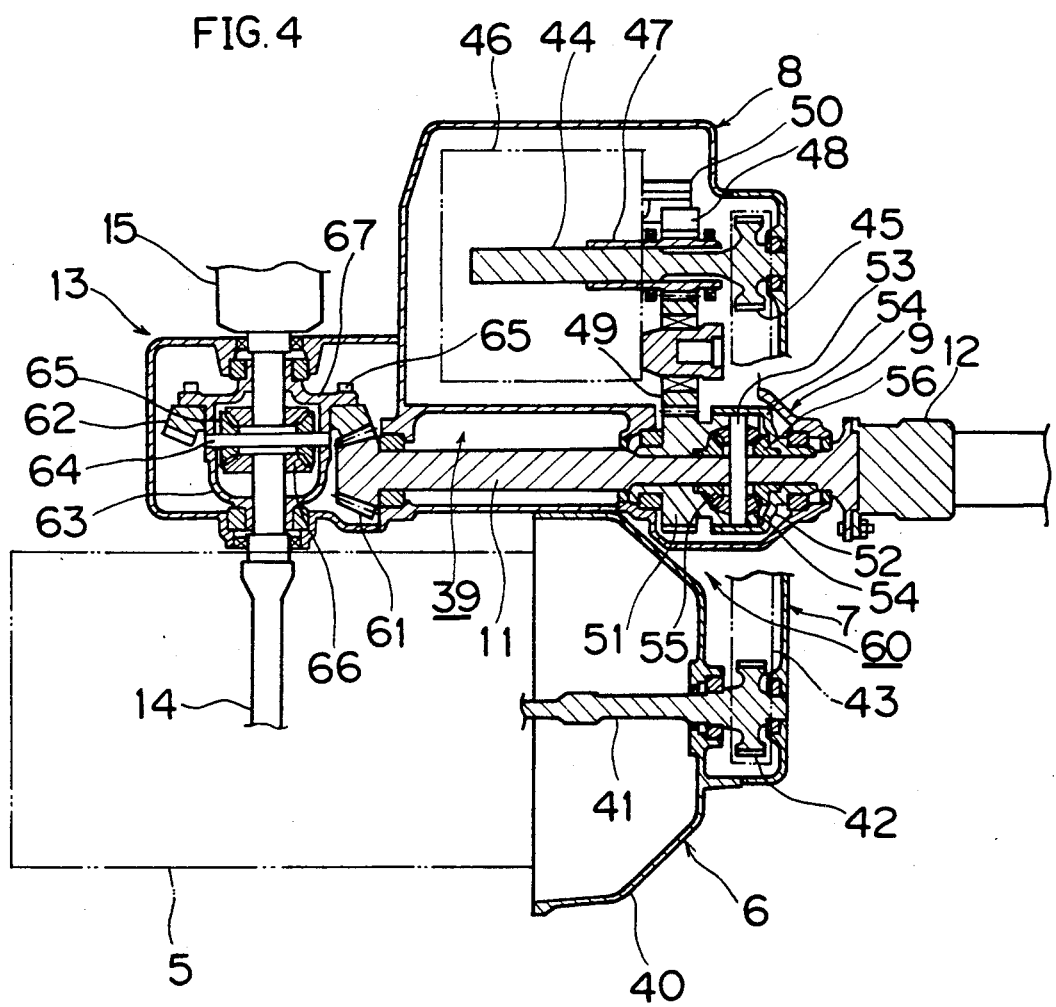
FIG. 4 is a sectional view taken on line N-N of FIG. 3.

As shown in FIGS. 3 and 4, a torque from an output shaft 10 of the engine 5 is inputted to the torque converter 6 and transmitted to a torque converter output shaft 41 after converted at the torque converter 6. The torque converter output shaft 41 extends in the longitudinal direction of the vehicle, the rear end of it projects to the rear from a housing 40 of the torque converter 6, and a drive gear 42 is formed near the rear end of the torque converter output shaft 41.

The transmission input shaft 44 extending in the longitudinal direction of the vehicle is provided at the transmission 8. The rear end part of the transmission input shaft 44 is set almost the same position as the rear end part of the torque converter output shaft 41 in the longitudinal direction of the vehicle, and a driven gear 45 is formed near the rear end part of the transmission input shaft 44. A chain 43 is wound between the drive gear 42 and the driven gear 45, and the torque outputted from the torque converter 6 is inputted into the transmission 8.

Thus inputted torque from the input shaft 44 to the transmission 8, not shown in detail in the drawing, is converted according to the load and the vehicle speed at a transmission part 46 constructed by a transmission gear, a clutch hydraulic application, etc., and transmitted to the transmission output shaft 47 through an output part 50. The transmission output shaft 47 is disposed coaxially with the input shaft 44 on the periphery of the input shaft 44 in the rear half part of the transmission 8, both the transmission output shaft 47 and the input shaft 44 pivot coaxially but independently.

An output member in the form of gear 48 is provided near the rear end part of the transmission output shaft 47. The output gear 48 meshes with an idle gear 49. The idle gear 49 meshes with an input gear 51 rotating integrally with a center differential casing 52 of a center differential unit 9. Accordingly, the torque outputted from the transmission 8 is transmitted to the center differential casing 52 through the output gear 48, the idle gear 49, and the input gear 51. The torque transmitted to the center differential casing 52 is transmitted to front and rear wheel side gears 55, 56 through a center differential pinion 54 fixed to the center differential casing 52 on a shaft 53, and further transmitted to a front and a rear drive shaft 11, 12 rotating with the front and the rear wheel side gears 55, 56. The center differential unit 9 is a bevel typed normal differential unit for connecting the front and rear drive shafts 11, 12 differentially and distributing the torque inputted to the center differential casing 52 into the both drive shafts 11, 12.

The torque of the front wheel drive shaft 11 is transmitted to a front differential casing 63 rotating integrally with a ring gear 62 through a bevel gear 61 and the ring gear 62 meshing with the bevel gear 61.

The torque transmitted to the front differential casing 63 is transmitted to the right and left side gears 67, 66 through a front differential pinion 65 on the shaft fixed to the front differential casing 63 on a shaft 64. The torque of the right and left side gears 67, 66 is transmitted to the right and left front wheels 17, 16 through right and left front shafts 15, 14 rotating together with the right and left side gears 67, 66. A front differential unit 13 is a bevel typed normal differential unit for connecting the left front axle shaft 14 with the right front axle shaft 15 differentially and distributing a torque inputted to the front differential casing 63 to the both front axle shafts 14, 15.

The torque of the rear drive shaft 12 is transmitted to right and left rear wheels through a rear differential unit and right and left rear axle shafts (not shown in the drawing).

The above center differential unit 9 is interposed between the transmission 8 and the housing 40 of the torque converter 6 in the widthwise direction of the vehicle body, near the rear end of the transmission 8 and just rear of the housing 40 in the longitudinal direction of the vehicle body, and below the engine output shaft 10, torque converter output shaft 41, and the transmission input shaft and output shafts 44, 47 in the vertical direction.

Since the rear half part of the housing 40 is tapered i.e., narrowed toward the end, a space 60 is formed between the rear half part of the housing 40 and the transmission 8. The center differential unit 9 is formed as if it goes inside of the space 60 and disposed by utilizing a dead space 60 effectively. Consequently, the power train P becomes compacted. Also, since the center differential unit 9 is provided to the rear of the power train P, the centroid of the power train P is moved to the rear wheel side. Therefore, the load distributed to the front wheel 16, 17 is reduced. Furthermore, since the center differential unit 9 is provided in the lower position, the rear wheel drive shaft 12 is also lowered and the interruption of the rear wheel drive shaft 12 and the passenger compartment 20 (refer to FIG. 1) is prevented.

The front wheel drive shaft 11 having the front end connected to the front differential unit 13 extends frontwardly from the position of the center differential unit 9 through a space 39 formed between the engine 5 and the transmission 8. The front differential unit 13 is slightly forward of the front surface of the transmission 8 in the longitudinal direction of the vehicle, between an axis of the output shaft 10 of the engine 5 and axes of input and output shafts 44, 45 of the transmission 8 in the widthwise direction of the vehicle, and at almost the same height as the center differential unit 9. In this construction, the left front axle shaft 14 pierces the oil pan 38

(refer to FIG. 2), or the bottom of the oil pan 38 is raised on the connecting part with the left front axle shaft 14.

Since the front wheel drive shaft 11 is disposed by utilizing the dead space 39 as shown in the above, the power train becomes compacted. Also, the power train P or a power train transmission mechanism becomes compacted in the longitudinal direction of the vehicle by disposing the center differential unit 9 between an axis of the output shaft 10 and axes of the transmission input and output shafts 44, 47 by utilizing the dead space formed in front of the transmission 8 effectively.

The second embodiment is described in reference to FIG. 5, (in the second embodiment through the fourteenth embodiment, only different points from FIGS. 1-4 will be described in order to avoid repetition).

Figure 5:
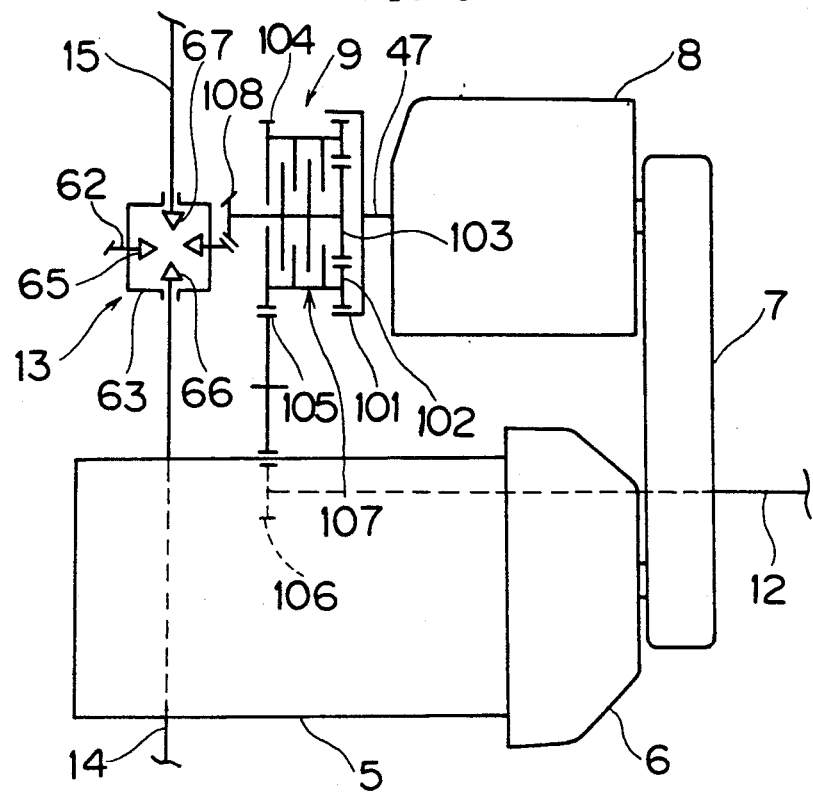
FIG. 5 is a skeleton diagram of a torque transmission of a second embodiment of the present invention.

In the second embodiment, as shown in FIG. 5, the torque of the transmission 8 is outputted to the front (in the longitudinal direction of the vehicle body). This also being the case in the third embodiment through the fourteenth embodiment. The center differential unit 9 is disposed slightly forward of the transmission 8, and the front differential unit 13 is disposed slightly forward of the center differential unit 9. As described, the transmission 8, the center differential unit 9, and the front differential unit 13 are disposed in a line in the longitudinal direction of the vehicle and accordingly, the torque transmission mechanism is simplified greatly. The wheel base gets a little longer since the center differential unit 9 is disposed between the transmission 8 and the front differential unit 13.

The center differential unit 9 is a planetary typed differential unit and basically, it differentially drive the front and rear wheels. The torque of the transmission output shaft 47 is transmitted to the ring gear 101. Some of the torque is transmitted to a rear wheel drive shaft 12 through a carrier 102, a rear wheel drive gear 104, an idle gear 105, and a rear wheel driven gear 106 in this order. The remainder is transmitted to the front differential unit 13 through a gear 102 and a bevel gear 108. A viscous coupling 107 is provided in the center differential unit 9 in order to limit the differentials between the front and rear wheels according to the running condition.

The third embodiment through the seventh embodiment are described below in reference to FIGS. 6-10.

In the third embodiment through the seventh embodiment, the center differential unit 9 is disposed to the front of the transmission 8, and the front differential unit 13 is disposed between the transmission 8 and the center differential unit 9. Since the front differential unit 13 is disposed to the rear of the center differential unit 9, the front differential unit 13 can be disposed to the further rear. This results in short wheel base and better turning or steering.

Figure 6:
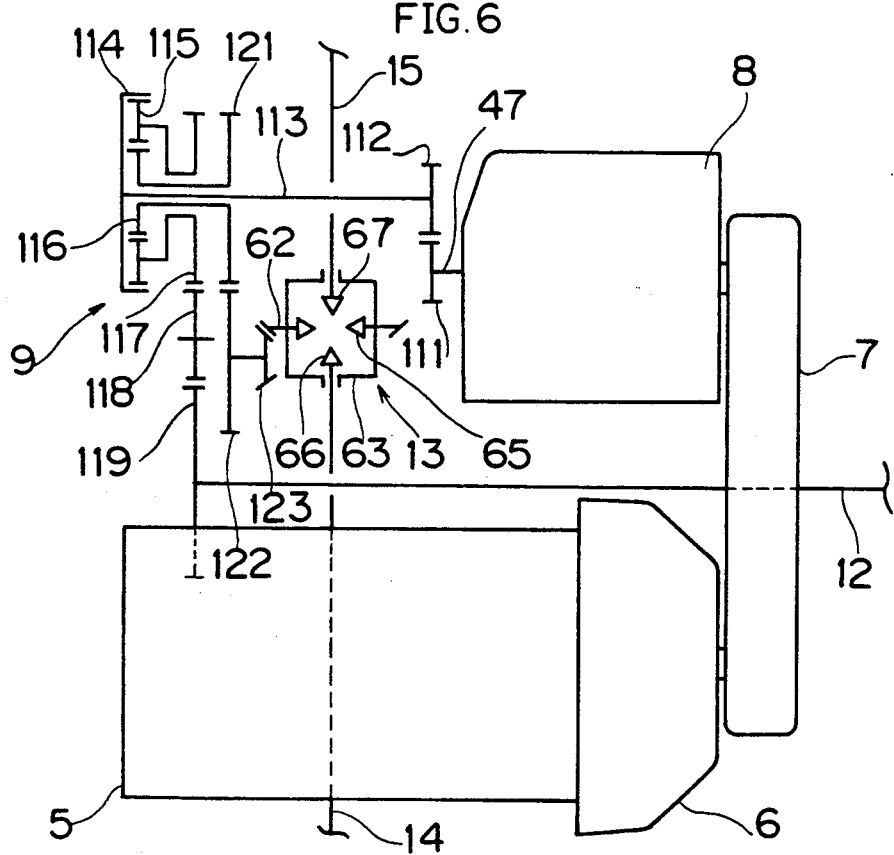
FIG. 6 is a skeleton diagram of a torque transmission of a third embodiment of the present invention.

In the third embodiment, as shown in FIG. 6, the torque of the transmission output shaft 47 is inputted to a ring gear 114 of the center differential unit 9 through a transmission drive gear 111, a transmission driven gear 112, and a shaft 113. Some of this torque is transmitted to the rear wheel drive shaft 12 through a carrier 115, a rear wheel drive gear 117, an idle gear 118, and a rear wheel driven gear 119. The remainder is transmitted to the front differential unit 13 through a sun gear 116 and a front wheel side driving gear 103.

Figure 7:
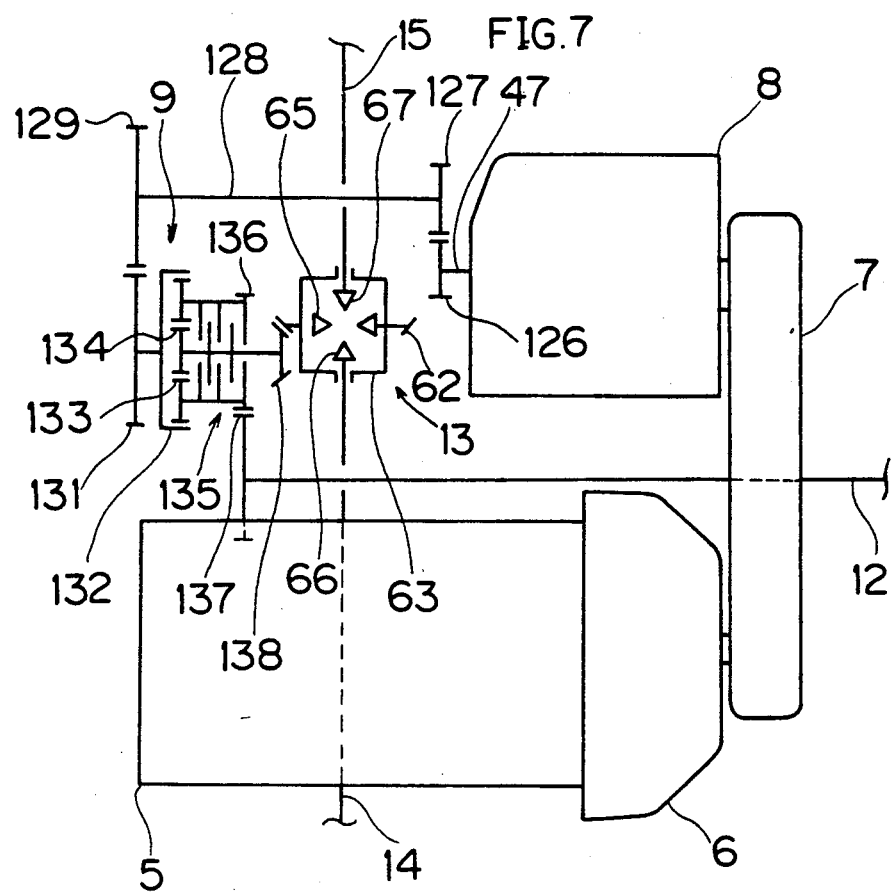
FIG. 7 is a skeleton diagram of a torque transmission of a fourth embodiment of the present invention.

In the fourth embodiment, as shown in FIG. 7, the torque of the transmission output shaft 47 is transmitted to a ring gear 132 of the center differential unit 9 through the transmission drive gear 12, a transmission driven gear 127, a shaft 128, an interposed drive gear 129, and an interposed driven gear 131. Some of the torque is transmitted to the rear wheel drive shaft 12 through a carrier 133, a rear wheel drive gear 136, and a rear wheel driven gear 137 in this order. The remainder is transmitted to the front differential unit 13 through a sun gear 134 and a bevel gear 138. A viscous coupling 135 is provided in the center differential unit 9 in order to limit the differentials between the front and rear wheels.

Figure 8:
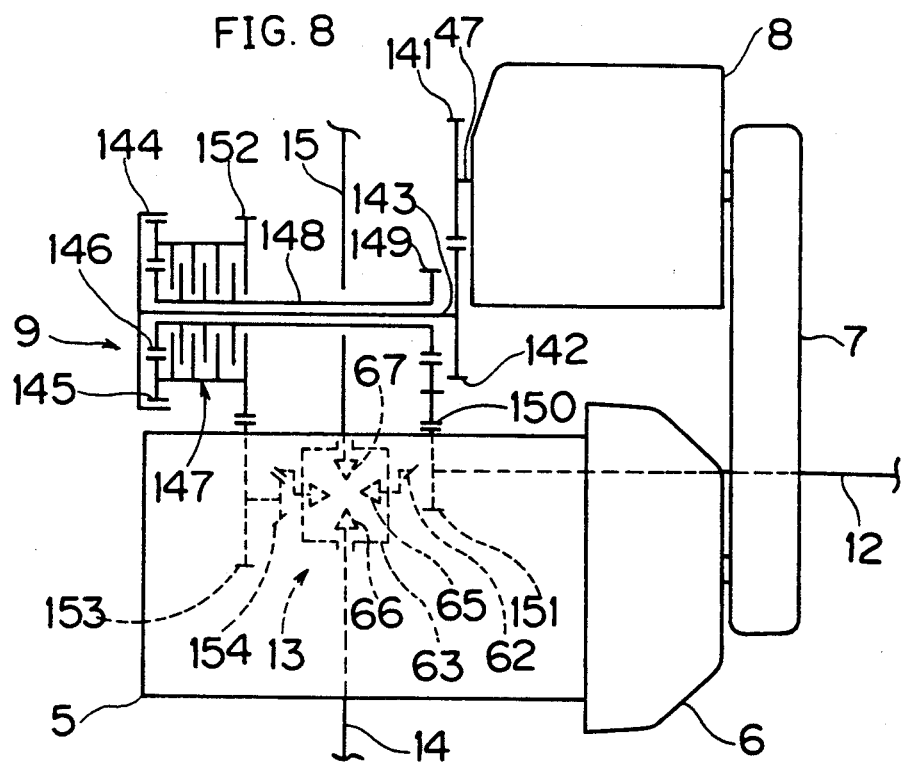
FIG. 8 is a skeleton diagram of a torque transmission of a fifth embodiment of the present invention.

In the fifth embodiment, as shown in FIG. 8, the torque of the transmission output shaft 47 is transmitted to a ring gear 144 of the center differential unit 9 through a transmission drive gear 141, a transmission driven gear 142, and a shaft 143. Some of this torque is transmitted to a rear wheel drive shaft 112 through a sun gear 146, a hollow shaft 148, a rear wheel drive gear 149, an idle gear 150, and a rear wheel driven gear 151 in this order. The remainder is transmitted to the front differential unit 13 through a carrier 145, a front wheel drive gear 152, a front wheel driven gear 153, and a bevel gear 154. A viscous coupling 147 is provided in the center differential unit 9.

Figures 9, 10:
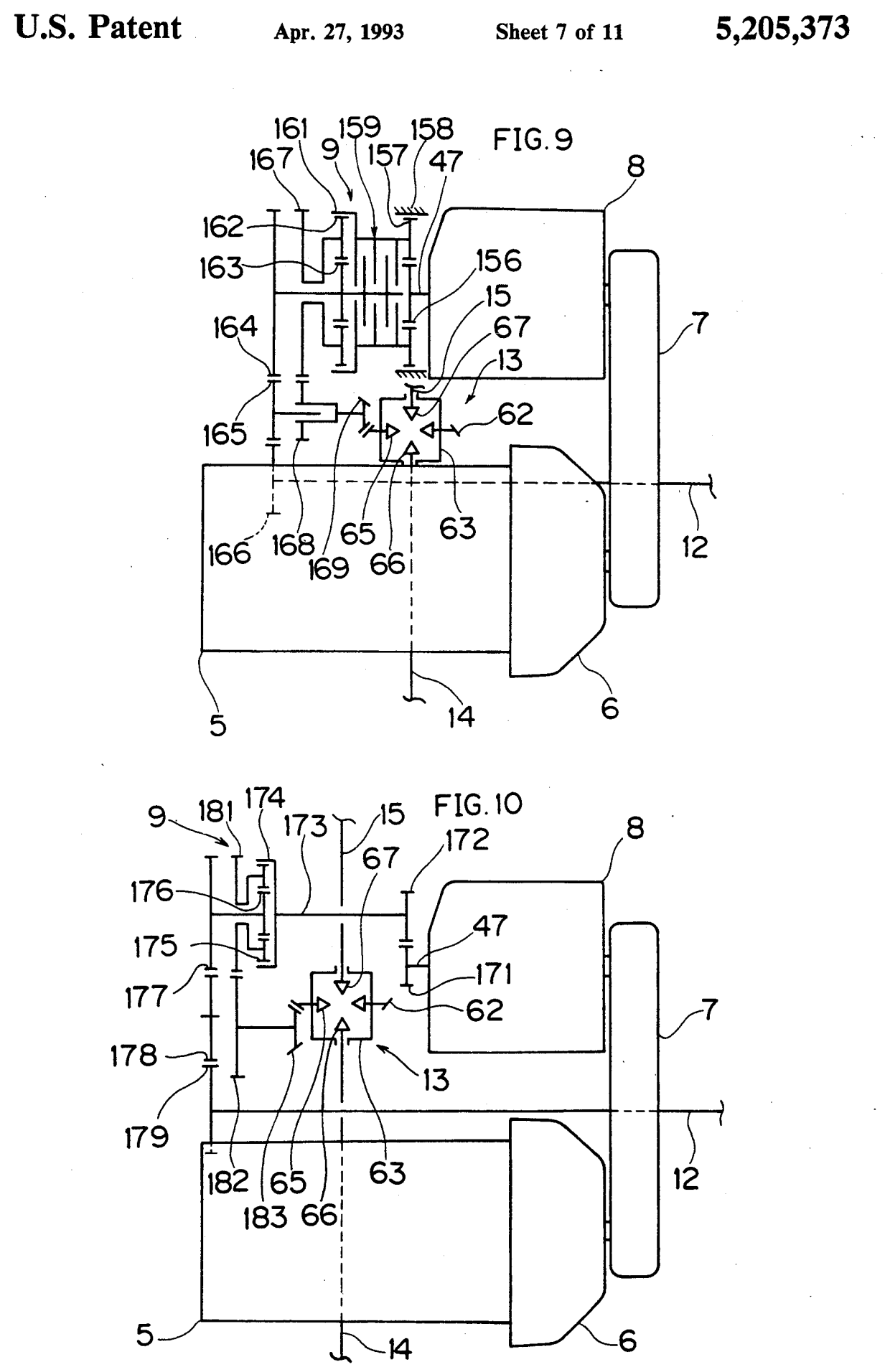

In the sixth embodiment, as shown in FIG. 9, the torque of the transmission output shaft 47 is inputted to a first sun gear 156 by which a first carrier 157 is driven to rotate, meshing with a fixing gear 158. This rotating force is inputted to a ring gear 161. Some of this torque is transmitted to a rear wheel drive shaft 12 through a second sun gear 163, a rear wheel drive gear 164, an idle gear 165, and a rear wheel driven gear 166. The remainder is transmitted to the front differential unit 13 through a second carrier 162, a front wheel drive gear 167, a front wheel driven gear 168, and a bevel gear 169. A viscous coupling 159 is provided in the center differential unit 9.

In the seventh embodiment, as shown in FIG. 10, the torque of the transmission output shaft 47 is inputted to a ring gear 174 of the center differential unit 9 through a transmission drive gear 171, a transmission drive gear 172, and a shaft 173. Some of this torque is transmitted to a rear wheel drive shaft 112 through a sun gear 176, a rear wheel drive gear 177, an idle gear 178, and a rear wheel driven gear 179. The remainder is transmitted to the front differential unit 13 through a second carrier 175, a front wheel drive gear 181, a front wheel driven gear 182, and a bevel gear 183.

An eighth embodiment through an eleventh embodiment are described below in reference to FIGS. 11-14.

In the eighth embodiment through the eleventh embodiment, the center differential unit 9 is situated between the engine 5 and the transmission 8 in the widthwise direction of the vehicle body, and the front differential unit 13 is disposed to the front of the center differential unit 9. Since the center differential unit 9 and the front differential unit 13 are situated between the engine 5 and the transmission 8 in the widthwise direction of the vehicle body, i.e., almost center of the vehicle in the widthwise direction, right and left front axle shafts 15, 14 are formed symetrically. Accordingly, the torque can be transmitted evenly to the right and left front wheels. A wheel base is longer since the front differential unit 13 is disposed to the rear of the center differential unit 9.

Figure 11:
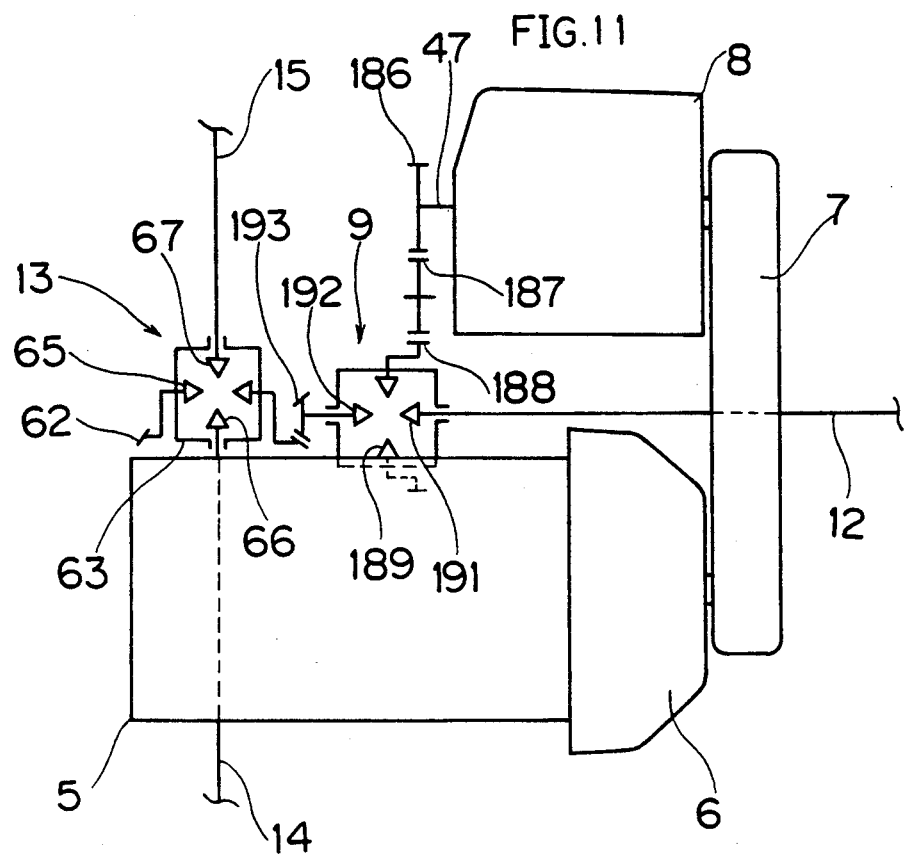
FIG. 11 is a skeleton diagram of a torque transmission of a eighth embodiment of the present invention.

In the eighth embodiment, as shown in FIG. 11, the center differential unit 9 is an evenly distributing torque type normal differential unit. The torque of the transmission output shaft 47 is transmitted to a ring gear 188 of the center differential unit 9 through a transmission drive gear 186 and an idle gear 187. The torque of the ring gear 188 is transmitted to a rear wheel side gear 191 and a front wheel side gear 192 through a pinion 189. The torque of the rear wheel side gear 191 is directly transmitted to the rear wheel drive shaft 12, and the torque of the front wheel side gear 192 is transmitted to the front differential unit 13 through a bevel gear 193.

Figure 12:
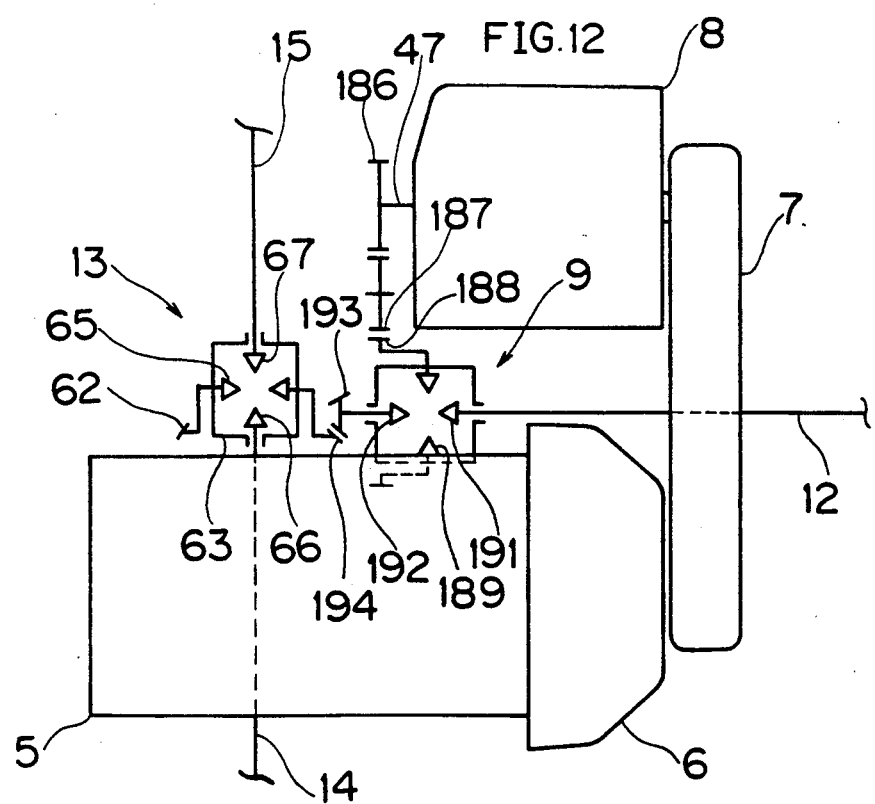
FIG. 12 is a skeleton diagram of a torque transmission of a ninth embodiment of the present invention.

In the ninth embodiment, as shown in FIG. 12, the torque transmission mechanism is the same as the eighth embodiment. However, comparing to the eighth embodiment, the center differential unit 9 is positioned rearwardly and the rear end part of the center differential unit 9 is in the rear of the front surface of the transmission 8. Therefore, the front differential unit 13 can be positioned relatively to the rear and the wheel base can be shortened.

Figure 13:
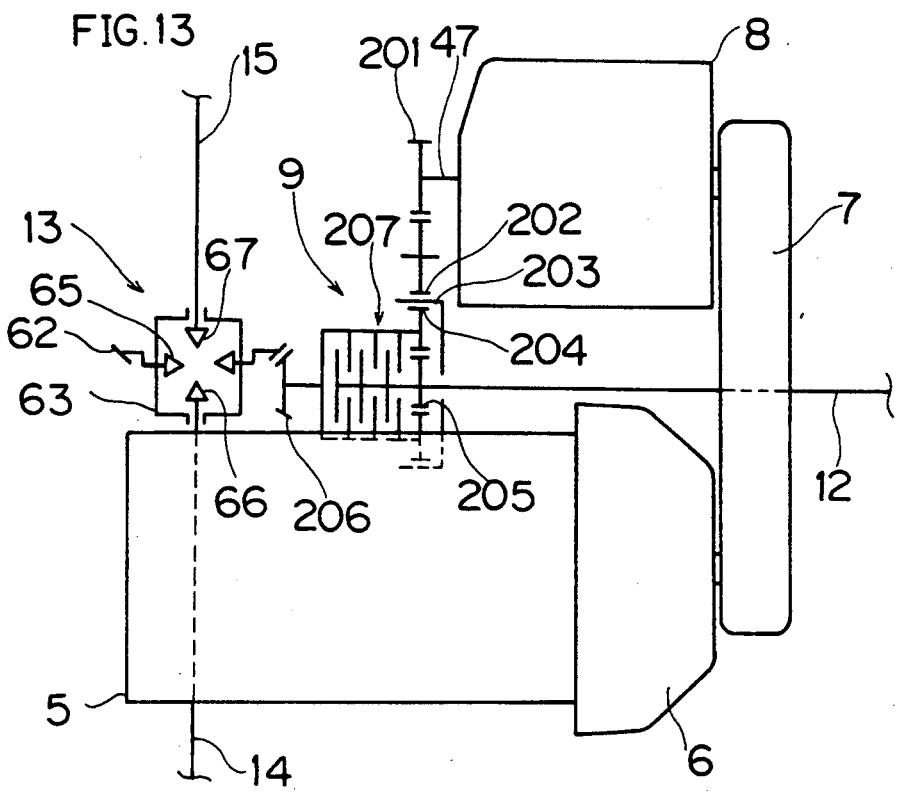
FIG. 13 is a skeleton diagram of a torque transmission of a tenth embodiment of the present invention.

In the tenth embodiment, as shown in FIG. 13, the torque of the transmission output shaft 47 is transmitted to a ring gear 203 through a transmission drive gear 201 and an idle gear 202. Some of this torque is directly outputted to a rear wheel drive shaft 12 from a sun gear 205, and the remainder is transmitted to the front differential unit 13 through a carrier 204 and a bevel gear 206. A viscous coupling 207 is provided in the center differential unit 9.

Figure 14:
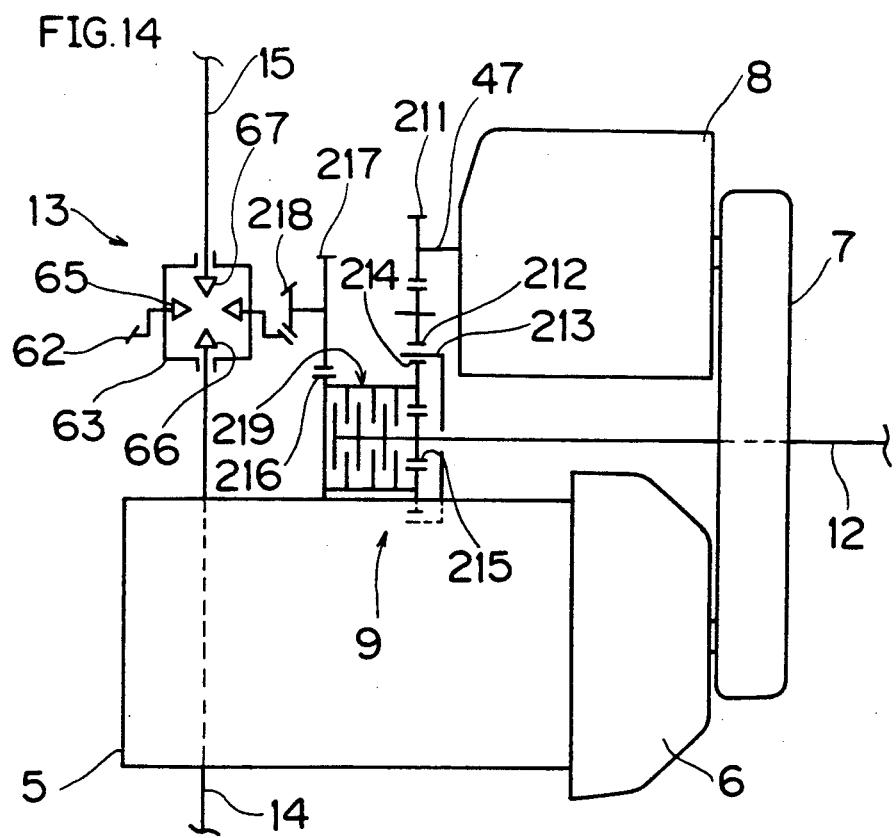
FIG. 14 is a skeleton diagram of a torque transmission of a eleventh embodiment of the present invention.

In the eleventh embodiment, as shown in FIG. 14, the torque of the transmission output shaft 47 is transmitted to a ring gear 213 through a transmission drive gear 211 and an idle gear 212. Some of this torque is transmitted to a rear wheel drive shaft 12 through a sun gear 215, and the remainder is transmitted to the front differential unit 13 through a carrier 214, a front wheel drive gear 216, a front wheel driven gear 217, and a bevel gear 218. A viscous coupling 219 is provided in the center differential unit 9.

The twelfth embodiment through the fourteenth embodiment is described below in reference to FIGS. 15-17.

In the twelfth embodiment through the fourteenth embodiment, the center differential unit 9 and the front differential unit 13 are provided coaxially with the front axle shafts 14, 15. Since the torque is transmitted easily from the center differential unit 9 to the front differential unit 13, the center differential unit 9 and the front differential unit 13 are formed integrally and the torque transmission mechanism is simplified. Also, since the front differential unit 13 can be positioned relatively rearwardly, the wheel base can be shortened.

Figures 15, 16:
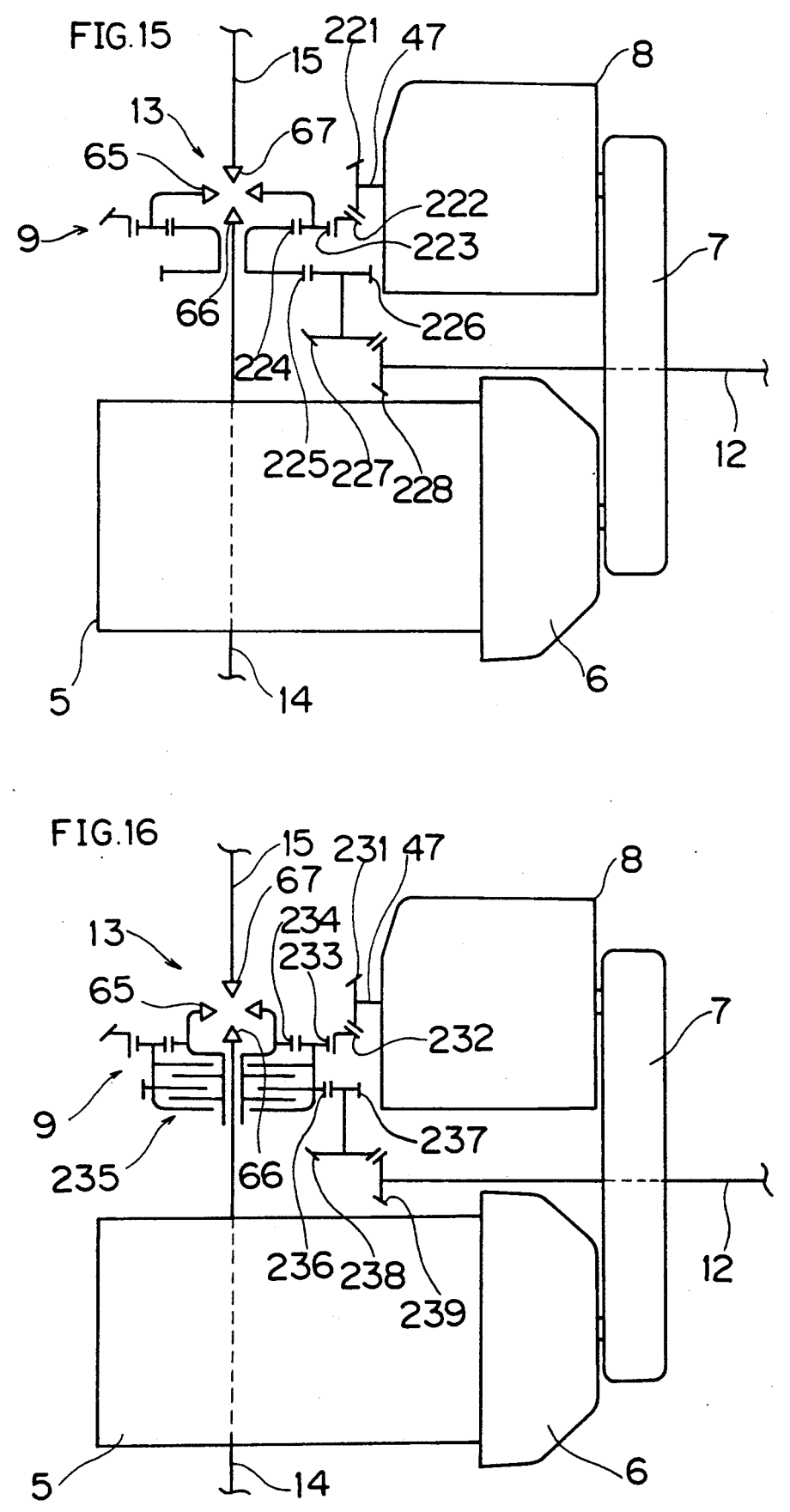

In the twelfth embodiment, as shown in FIG. 15, the torque of the transmission output shaft 47 is inputted to a ring gear 222 of the center differential unit 9 through a first bevel gear 221. Some of the torque is transmitted to the rear wheel drive shaft 12 through a sun gear 224, a rear wheel drive gear 225, a rear wheel driven gear 226, a second bevel gear 227, and a third bevel gear 228. The remainder is directly inputted to a pinion 65 of the center differential unit 13 from a carrier 223.

In the thirteenth embodiment, as shown in FIG. 16, the torque of the transmission output shaft 47 is inputted to a ring gear 232 of the center differential unit 9 through a first bevel gear 231. Some of the torque is transmitted to the rear wheel drive shaft 12 through a carrier 233, a rear wheel drive gear 236, a rear wheel driven gear 237, a second bevel gear 238, and a third bevel gear 239. The remainder is directly transmitted to a pinion 65 of the center differential unit 13 from a sun gear 234. A viscous coupling 235 is provided in the center differential unit 9.

Figure 17:
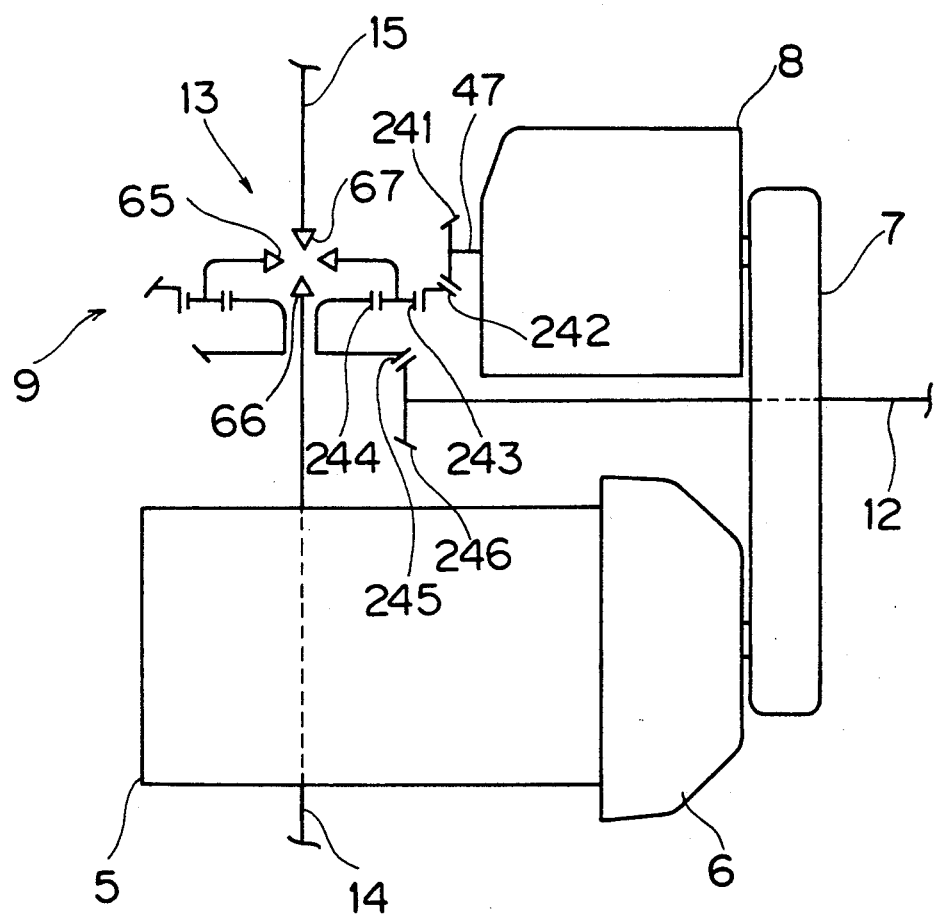
FIG. 17 is a skeleton diagram of a torque transmission of a fourteenth embodiment of the present invention.

In the fourteenth embodiment, as shown in FIG. 17, the torque of the transmission output shaft 47 is inputted to a ring gear 242 of the center differential unit 9 through a first bevel gear 241. Some of the torque is transmitted to the rear wheel drive shaft 12 through a sun gear 244, a second bevel gear 245, and a third bevel gear 246. The remainder is directly transmitted to a pinion 65 of the center differential unit 13 from a carrier 243.

What is claimed is:

1. A structure of a vehicle power train comprising an engine positioned lengthwise in a vehicle a transmission positioned adjacent to said engine in a widthwise direction of the vehicle, and a power train, said power train comprising a front differential unit for distributing a power outputted from said transmission to a front right wheel and a front left wheel, said front differential unit being disposed in front of said transmission in the longitudinal direction of said vehicle and between an engine output shaft and a transmission output shaft in the widthwise direction of said vehicle.

2. A structure of a vehicle power train as claimed in claim 1, further comprising an output member for outputting said power from said transmission, said output member being provided near a rear end part of said transmission, wherein a power outputted from said output member is transmitted to said front differential unit through a front wheel drive shaft interposed between said engine and said transmission.

3. A structure of a vehicle power train as claimed in claim 1, wherein said engine is inclined toward said transmission in the widthwise direction of said vehicle.

4. A structure of a vehicle power train as claimed in claim 3, wherein said engine is a V-type engine having right and left banks and an intake air system is provided above either one of said right and left banks on said transmission side.

5. A structure of a vehicle power train as claimed in claim 1, wherein said engine is inclined forwardly.

6. A structure of a vehicle power train as claimed in claim 1, wherein a center differential unit distributing said power outputted from said transmission to front wheels and rear wheels is provided in front of said transmission in the longitudinal direction of said vehicle.

7. A structure of a vehicle power train as claimed in claim 6, wherein said front differential unit is positioned in front of said center differential unit in the longitudinal direction of the vehicle.

8. A structure of a vehicle power train as claimed in claim 6, wherein said front differential unit is interposed between said center differential unit and said transmission in the longitudinal direction of said vehicle.

9. A structure of a vehicle power train as claimed in claim 1, wherein a center differential unit distributing said power outputted from said transmission to front wheels and rear wheels is interposed between said engine and said transmission in the widthwise direction of said vehicle.

10. A structure of a vehicle power train as claimed in claim 9, wherein said center differential unit is interposed between said front differential unit and said transmission in the longitudinal direction of said vehicle.

11. A structure of a vehicle power train as claimed in claim 1, wherein a center differential unit distributing said power outputted from said transmission to front wheels and rear wheels is disposed coaxially with a front axle shaft.

12. A structure of a vehicle power train having an engine situated lengthwise in a vehicle and a transmission situated in the side of said engine in parallel, a power train comprising a center differential unit distributing a power outputted from said transmission to front wheels and rear wheels; and a front differential unit distributing a power outputted from said center differential unit to front right wheel and front left wheel, said both center and front differential units are disposed in front of said transmission in the longitudinal direction of said vehicle.

* * * * *